United States Patent [19]
Boos et al.

[11] Patent Number: 5,169,444
[45] Date of Patent: Dec. 8, 1992

[54] PROCESS FOR PREPARING CALCIUM SULFATE ANHYDRITE

[75] Inventors: Friedrich-Wilhelm Boos, Castrop-Rauxel; Franz Wirsching, Iphofen, both of Fed. Rep. of Germany

[73] Assignee: Gebrüder Knauf Westdeutsche Gipswerke KG, Iphofen, Fed. Rep. of Germany

[21] Appl. No.: 657,360

[22] Filed: Feb. 19, 1991

Related U.S. Application Data

[63] Continuation of Ser. No. 464,854, Jan. 17, 1990, abandoned, which is a continuation-in-part of Ser. No. 386,016. Jul. 25, 1989, abandoned, which is a continuation of Ser. No. 16,725, Feb. 19, 1987, abandoned.

[30] Foreign Application Priority Data

Feb. 20, 1986 [DE] Fed. Rep. of Germany ....... 3605393
Jan. 19, 1989 [DE] Fed. Rep. of Germany ....... 3901428

[51] Int. Cl.$^5$ ............................................. C01F 11/46
[52] U.S. Cl. .................................... 106/772; 423/555; 423/170
[58] Field of Search ............... 423/555, 167, 170, 319, 423/320; 106/109

[56] References Cited

U.S. PATENT DOCUMENTS

| | | | |
|---|---|---|---|
| 1,776,595 | 9/1930 | Nordengren | 423/320 |
| 2,021,910 | 11/1935 | Crundall | 423/555 |
| 2,151,331 | 3/1939 | Roberts | 423/555 |
| 2,151,339 | 3/1939 | Sullivan | 423/555 |
| 2,197,953 | 4/1940 | Sullivan | 423/555 |
| 4,234,345 | 11/1980 | Fässle | 106/110 |
| 4,387,083 | 6/1983 | Weterings et al. | 423/555 |
| 4,588,570 | 5/1986 | Davister et al. | 423/320 |
| 4,743,438 | 5/1988 | Kennedy et al. | 423/320 |

FOREIGN PATENT DOCUMENTS

| | | | |
|---|---|---|---|
| 0012487 | 12/1979 | European Pat. Off. | 423/555 |
| 0125224 | 5/1984 | European Pat. Off. | 423/555 |

*Primary Examiner*—Anthony McFarlane
*Attorney, Agent, or Firm*—Wegner, Cantor, Mueller & Player

[57] ABSTRACT

The process for preparing calcium sulfate anhydrite II by heating a flowable powder of flue gas gypsum moistened with less than 20% by weight, and preferably with from 7 to 17% by weight, of diluted sulfuric acid, wherein the sulfuric acid content is from 0.5 to 7% by weight, and preferably 1 to 3% by weight of sulfuric acid, based on the total mixture, is carried out by that the total mixture is direct-fired or is rapidly heated with indirect heat exchangers having relatively high wall temperatures whereby it is heated at temperatures of from 80° C. to 190° C. and releases the water adherent from the diluted sulfuric acid as well as two moles of water of crystallization, and then the virtually anhydrous product is annealed at temperatures of from 80° C. to 190° C. for 0.3 to 24 hours.

22 Claims, No Drawings

PROCESS FOR PREPARING CALCIUM SULFATE ANHYDRITE

This application is a file wrapper continuation of U.S. application Ser. No. 464,854 filed Jan. 17, 1990; which is a continuation-in-part of Ser. No. 386,016 filed Jul. 25, 1989; which is a file wrapper continuation of Ser. No. 16,725 filed Feb. 19, 1987, all abandoned.

BACKGROUND OF THE INVENTION

It has been known that calcium sulfate dihydrate upon heating in the dry state is first dehydrated to form beta-calcium sulfate hemihydrate, which upon further heating loses its water of crystallization and thereby is converted into calcium sulfate anhydrite. In this process, first the calcium sulfate anhydrite III (soluble calcium sulfate) is formed wherein the crystal structure of the calcium sulfate hemihydrate has mostly been retained. Thus, it can easily be rehydrated and undergo transformation into the calcium sulfate dihydrate in a per se known manner. Thus, calcium sulfate anhydrite III is a form of calcium sulfate capable of relatively rapid setting with water. Upon further heating, the calcium sulfate anhydrite II (insoluble calcium sulfate) is formed with a rhombic crystal lattice having closest packing and relative stability to water (at temperatures below 40° C.).

From the European Published Unexamined Patent Application EP-OS 0,012,488, it is apparent that calcium sulfate hemihydrate is preferably formed in a suspension with sulfuric acid having a concentration of from 40 to 60% by weight at a temperature of from 40° C. to 80° C. in the presence of at least one tetravalent metal compound. From the European Patent Specification EP-PS 0,012,487, it is apparent that under comparable conditions, and more specifically in the presence of di-, tri- and/or pentavalent metal compounds, a calcium sulfate anhydrite having an average particle size of from 0.5 to 3μm is formed. The processes described in the two European Patent Publications were preferably carried out with calcium sulfate dihydrate obtained in the course of the production of phosphoric acid. Thus, it is the so-called "phosphogypsum."

Further processes for the partial preparation of very finely divided calcium sulfate anhydrite, using very high temperatures, have been known, for example, from the U.S. Pat. No. 4,080,422 wherein ground dihydrate is blown at from 800° C. to 1200° C. into the hot gases of a flash-drier. According to the Japanese Published Unexamined Patent Application JP-OS 77-114494 (Chem. Abstracts 88, 1978, No. 12, No. 78089), phosphogypsum is calcined at 900° C. with three to eight times the amount of calcium phosphate and ground, whereby an anhydrite II is formed which will again set when mixed with alum and water.

If calcium sulfate dihydrate and/or calcium sulfate hemihydrate is converted into anhydrite II by means of sulfuric acid and at low temperatures, it is always necessary to work in suspension and to employ relatively large amounts of sulfuric acid. Thus, for example, according to the European Published Unexamined Patent Application EP-OS 0 112 317, alpha-hemihydrate from a phosphoric acid wet process is heated in suspension in an excess of at least 35% sulfuric acid to at least 60° C. for at least 60 minutes, whereby a finely divided anhydrite is formed. The particle size is between 2 and 40 μm, depending on the process conditions. From the Norwegian Patent Specification 54 999 from the year 1931 as quoted therein, it is apparent that by heating calcium sulfate anhydrite III (soluble calcium sulfate) with 24% sulfuric acid, a finely divided amorphous anhydrite is formed. In said process the amount of acid has to be at least so large that the anhydrite is at least completely wet. Preferably, larger amounts of acids were employed. It has been noted that at higher acid concentrations and higher temperatures, considerable amounts of the calcium sulfate were decomposed to form calcium bisulfate or that upon use of a too diluted sulfuric acid, calcium sulfate dihydrate is formed.

From the U.S. Pat. Nos. 2,021,910, 2,822,242 and 2,956,859, it is also apparent that anhydrite is formed only in the presence of relatively high amounts of a relatively concentrated sulfuric acid and that higher temperatures greatly accelerate the conversion, however also result in the formation of more coarsely crystalline products.

SUMMARY OF THE INVENTION

It has now surprisingly been found that the preparation of calcium sulfate anhydrite II by reacting calcium sulfate dihydrate with sulfuric acid at elevated temperatures can be carried out in such a way that finely divided calcium sulfate dihydrate is heated with only from 0.5 to 7% by weight, and preferably from 1 to 3% by weight, of sulfuric acid. The sulfuric acid is present in a solution, with the solution comprising less than 20% by weight of the total mixture, and preferably of between 7 and 14% by weight. The mixture is heated at 70° C. to 100° C., and, if desired, is neutralized with the equivalent amount of calcium hydroxide. Thus, the liquid content in the mixture is so low that the reactants are present in the form of a moist, finely divided powder and in this state undergo the reaction to form the anhydrite. The mixture of the reactants therefor is present in a moist powdery condition.

Thus, under the conditions according to the invention, a fine crystalline rhombic anhydrite II can be obtained with essentially lower amounts of sulfuric acid than conventionally required so far and at relatively low temperatures, and said anhydrite II has excellent properties and can be utilized or further processed in various ways. The employed amounts of acid are so low that for some intended uses they may even remain in the product. However, if desired, i t is also possible to neutralize these amounts of acid after the conversion with the equivalent amount of calcium hydroxide. The neutralization product formed thereby is also crystalline anhydrite II.

DETAILED DESCRIPTION OF THE INVENTION

Thus, under the conditions according to the invention, a new calcium sulfate anhydrite can be obtained with essentially lower amounts of acid than conventionally required so far and at relatively low temperatures, such that the product has excellent properties and can be utilized or further processed in several ways.

It was particularly surprising that a finely divided calcium sulfate dihydrate of various origins can be employed as the starting material. Thus, as the finely divided calcium sulfate dihydrate there may be employed, for example, a finely ground, naturally recovered calcium sulfate dihydrate. However, it is preferred to employ the moist calcium sulfate dihydrate as will be obtained from flue gas de-sulfurization in large amounts in the future (REA gypsum).

It is a particular advantage of the process according to the invention that the temperatures required for the reaction of from 50° C. to 130° C., and preferably from 70° C. to 100° C., can be recovered from the waste heat of a power station. Thus, the process can be carried out in a particularly simple and economical manner if the flue gas gypsum at the place of its generation is directly reacted to form the desired finely divided crystalline rhombic calcium sulfate anhydrite II.

A very interesting use of the product according to the invention comprises grinding the finished calcium sulfate anhydrite II in the wet state to particle sizes of less than 5μm, and preferably less than 2μm. The product thus obtained is excellently suitable as a filler and even as a coating agent in paper industry.

It is of particular importance that the product obtained according to the invention does not react or only very slowly reacts with water and, hence, it can be washed with water and dried without undergoing the reverse formation of the starting material calcium sulfate dihydrate. Surprisingly, also the degree of whiteness of the finely ground product thus obtained is so high that it can be employed as a paper coating pigment. If it is intended to store the finely ground product as an aqueous suspension for an extended period of time, then the re-hydration to form the dihydrate may be prevented or retarded by means of retardants such as polyphosphates, provided that these additives would not adversely affect further processing or the desired properties of the final products.

The product thus obtained according to the invention is usable as a pigment and/or filler, for example, for synthetic materials, dispersion dyes and adhesives. For these intended uses, the starting material should meet the following specifications:

| Degree of moisture | <10% |
|---|---|
| Purity (gypsum content) | >95% |
| Magnesium oxide, water-soluble | <0.1% |
| Sodium oxide | <0.06% |
| Chloride | <0.01% |
| Calcium sulfite | <0.5% |
| pH Value | 5-9 |
| Degree of whiteness | >70% |

In order to carry out the process according to the invention, moist finely divided flue gas gypsum, for example, in the state as formed, is mixed with the required amount of sulfuric acid and heated to the desired temperature. Depending on the applied temperature, possible agitation and aeration of the reaction may proceed faster or slower, while, however, some sulfuric acid may be released into the gaseous phase. The reaction will proceed so that first the originally employed finely divided calcium sulfate dihydrate particles will appear to be mostly retained, while in the course of the conversion, they will turn into agglomerates of moist, finely crystalline anhydrite particles. Thus, these agglomerates may easily be dispersed into finely divided crystalline particles. Dispersing in the wet state is particularly suitable.

The investigations have shown that at acid amounts of less than 0.5% by weight, although very slow dehydration to form the anhydrite II will already take place, the conversion is so slow that there is a question of the economical efficiency of the process. Thus, it is preferred to operate with a minimum concentration of 1% by weight of sulfuric acid. It has further been determined that sulfuric acid amounts of more than 7% as used in the processes according to prior art require the subsequent separation thereof and will also pose a question as to the economical efficiency of the process. Thus, it is preferred to employ sulfuric acid amounts of only up to 3% by weight. The amount of sulfuric acid may be added, for example, to the finely divided moist calcium sulfate dihydrate in a more or less concentrated form. In all cases the total liquids content of the mixture of calcium sulfate dihydrate and acid solution must be less than 20% by weight and preferably is between 7 and 14% by weight. Higher contents of liquid will result in undesired agglutination and clogging. Moisture contents below 5% are technically less suitable for the process. Because of said liquids content, the mixture of the reactants is present in a moist powdery condition in which, then, the reaction occurs. Thus, the procedure according to the invention is basically distinguished from the operation in suspension as known so far.

Since flue gas gypsum is obtained having a moisture content of from 7 to 12%, and preferably even with a residual moisture of less than 10%, it is possible to carry out the last washing operation with a sufficiently concentrated acid and to bring the product thus obtained to the reaction temperatures of from 50° C. to 130° C., and preferably from 70° C. to 100° C. It is particularly economical to carry out the process according to the invention in such a manner that the still moist flue gas gypsum is admixed with a corresponding amount of acid, mixed and then heated.

Thus, the subject matter of the present invention is a process for preparing calcium sulfate anhydrite by reacting calcium sulfate dihydrate with sulfuric acid at elevated temperatures. The process is characterized in that a finely divided calcium sulfate dihydrate is heated with from 0.5 to 7% by weight, and preferably from 1 to 3% by weight of sulfuric acid. The acid is present in solution, with the solution comprising less than 20% by weight of the mixture, and preferably between 5 and 14% by weight. The mixture is heated at temperatures of from 50° C. to 130° C., and preferably from 70° C. to 100° C., for a definite time and, if desired, is neutralized with the equivalent amount of calcium hydroxide.

A subject matter of the invention is the use of the calcium sulfate anhydrite as a filler and coating agent in the paper industry.

In order to carry out the process according to the invention, moist finely divided flue gas gypsum, for example, in the state as formed, is mixed with the required amount of sulfuric acid, phosphoric acid or the mixture comprising phosphoric acid and sulfuric acid and brought to have the desired temperature for a definite period of time. Depending on the applied temperature and period of time, and also on a possible agitation and aeration of the reaction may proceed faster or slower. However, as sulfuric acid is used, some of it may be released into the gaseous phase and will have to be removed therefrom in a suitable manner.

The reaction proceeds in such a manner that first the originally employed finely divided calcium sulfate dihydrate particles by appearance will be mostly retained while in the course of the conversion they will turn into agglomerates of the calcium sulfates anhydrite.

In practice, it is possible to carry out the process according to the invention in so-called disk dryers, while it is preferred that several disks are arranged atop of one another for a so-called rack drier. On said disk driers, the moist and flowable composition by means of a slowly moving agitator arm having conveyor scoops is advanced on a spiral route either outwardly from the inside or inwardly from the outside and then falls down to the next underlying disk drier where it is advanced in the opposite direction. Thus, it is possible, while maintaining constant temperatures and constant throughput times, reproducibly to adjust the temperature and residence time in order to obtain as well reproducible results thereby. Thus, such rack driers afford a continuous dehydration to be effected at an accurate temperature control and variable residence times. The energy requirement is low, whereas the thermal efficiency is high. There are only minor problems with dust formation, since there is only a low mechanical stress exerted onto the product. The vapors that possibly may contain some sulfuric acid are discharged at only one location and therefrom may be either subjected to condensation or otherwise purified.

In such disk driers, the residence times are chosen such as to be from 20 to 300 minutes, and preferably from 30 to 120 minutes. The selected residence time in the first place will depend on the layer thickness of the starting material, however, also on the particle size distribution and the moisture content. Of course, the process according to the invention may be carried out also using other known driers and calcinating apparatuses as used in the gypsum industry.

Attempts to shorten the reaction time of calcium sulfate dihydrate to calcium sulfate anhydrite II, for example by increasing the reaction temperature, did not lead to results usable in practice. Namely, it was surprisingly observed that, although the reaction time indeed can be quite significantly reduced if the gas mixture is direct-fired or is rapidly heated with indirect heat exchangers having relatively high wall temperatures whereupon it becomes heated at temperatures of from 80° C. to 190° C. and releases the water adherent from the diluted sulfuric acid as well as two moles of water of crystallization, the product is to a significant extent different from the products formed by the process described above. More particularly, it was apparent that calcium sulfate anhydrite II thus obtained is much more reactive and reacts much faster with water to again provide calcium sulfate dihydrate than the product described above. Surprisingly, it has been further observed that this undesirable higher reactivity of the calcium sulfate anhydrite II obtained by direct-firing or rapid heating may be reduced so that in turn a very stable calcium sulfate anhydrite II is formed, if the virtually anhydrous product obtained by direct-firing or rapid heating is annealed at temperatures of from 80° C. to 190° C. for 0.3 to 24 hours. In the course thereof it is necessary, that during the annealing at least 0.5% by weight of sulfuric acid is present. Otherwise the undesired high reactivity is either not at all or too slowly reduced. After the annealing step, the acid may be washed out with water and/or be neutralized with most finely divided calcium carbonate. Hereby the reactivity can be still further reduced.

Thus, a further subject matter of the present invention is a process for preparing calcium sulfate anhydrite II by heating a flowable powder of flue gas gypsum moistened with less than 20% by weight, and preferably with from 7 to 17% by weight, of diluted sulfuric acid, wherein the sulfuric acid content is from 0.5 to 7% by weight, and preferably 1 to 3% by weight of sulfuric acid, based on the total mixture, said process being characterized in that the total mixture is direct-fired or is rapidly heated with indirect heat exchangers having relatively high wall temperatures whereby it is heated at temperatures of from 80° C. to 190° C. and releases the water adherent from the diluted sulfuric acid as well as two moles of water of crystallization, and then the virtually anhydrous product is annealed at temperatures of from 80° C. to 190° C. for 0.3 to 24 hours.

The annealing procedure may preferably be carried out in a container to be loaded from the top, from which container the annealed final product is withdrawn from the bottom. The product is filled into said container when still hot. The process of stabilization depends on the time, the temperature and the acid content. If the annealing operation is carried out at lower temperatures, for example from 80° C. to 110° C., then extended periods of annealing are required, preferably from 2.5 to 24 hours. If the annealing operation is carried out at from 150° C. to 190° C., then times of from 0.3 to 0.8 hours are sufficient. Preferably, the annealing step is carried out in the range of from 130° C. to 150° C., where an annealing time of from 0.5 to 2 hours is sufficient. In the preferred embodiment of the process in a top-loaded container with discharge at the bottom of the annealed final product the annealing temperature is only slightly below the temperature at which the total mixture is supplied from the direct-fire or heat exchanger. The wall of such a heat exchanger preferably should be at a temperature of from 150° C. to 600° C. Moreover, a stream of air should entrain and remove the water vapor formed.

However, annealing may also be carried out in the same apparatus in which the gypsum has been converted to anhydrite. This is particularly convenient with rotary kilns which then have to be adapted to suit this purpose.

In the process according to the invention, since part of the sulfuric acid added is removed from the system with the hot gas, said gases should subsequently passed to a flue gas desulfurization unit.

The process according to the invention may be carried out in a rotary kiln, a flash drier, a whizzer or a cyclone combustion aggregate. Direct-firing may be effected by using natural gas, light fuel oil, heavy fuel oil or heavy oil. Coal is less preferred, if contamination by ashes is to be avoided. If, however, the product is only to be supplied to the cement industry, then such contamination by coal ashes will be acceptable.

If the process is operated with indirect heat supply, disk driers or multiplate driers, indirectly heated rotary kilns, boilers or indirectly heated pan driers with helical pass may be employed. The indirect heating may be effected with hot gases, steam or heat carrier oils.

Annealing may be carried out in the same apparatus in which the gypsum has been converted to anhydride. This is particularly convenient with the indirectly heated apparatus.

Thus, the process according to the invention may be carried out also in such a manner that portions of the hot gases of a combustion plant with flue gas desulfurization unit are employed and the vent gases are then passed to said desulfurization unit. Thus, it is possible to carry out the process according to the invention immediately at the same site where the flue gas gypsum is accrued. According to the invention, from the flue gas gypsum there is directly obtained most finely crystalline calcium sulfate anhydrite II which may be used for a great variety of purposes. In addition to the use in the cement industry, it may be used, more particularly, as a filler or coating agent in the paper industry, as a pigment and/or filler for plastics, disperse dyes and adhesives etc. If for these kinds of uses the residual amount of sulfuric acid is intolerable, then it may be neutralized by equimolar amounts of calcium hydroxide or most finely divided calcium carbonate. The most finely crystalline product, which nevertheless is relatively stable to water, can be slurried with water prior to neutralization and be washed without occurrence of an undesired re-hydration. Then, subsequent neutralization may also be carried out.

The process according to the invention and the product obtained thereby is further illustrated in the following examples.

EXAMPLE 1

Fifty kilograms of dry REA gypsum dihydrate are mixed with 1.5 l of sulfuric acid having a density of 174 g/cm$^3$ which has been diluted with 5 l of H$_2$O and the mixture is heated to 90° C. After the total amount of water (moisture water and water of crystallization) has been evaporated, which under the experimental conditions has been accomplished after about 2 hours, the mixture is neutralized with about 600 g of Ca(OH)$_2$, and stirring is continued for another 15 minutes.

The product formed thereby is crystalline rhombic calcium sulfate anhydrite II.

After the conversion, the degree of whiteness of 76% in the REA gypsum dihydrate has increased to 91% in the REA anhydrite II.

EXAMPLE 2

Fifty kilograms of REA gypsum dihydrate having a free moisture content of 8% are mixed with 1.5 l of sulfuric acid having a density of 1.74 g/cm$^3$ which has been diluted with 1 l of water and are heated to 100° C. After the total amount of water (moisture water and water of crystallization) has been evaporated, which under the experimental conditions has been accomplished after about 2 hours, the mixture is neutralized with about 600 g of Ca(OH)$_2$, and stirring is continued while the mixture is warm.

The product formed thereby is crystalline rhombic calcium sulfate anhydrite II.

After the conversion, the degree of whiteness of 80% in the REA gypsum dihydrate has increased to 90% in the REA anhydrite II.

EXAMPLE 3

Fifty kilograms of REA gypsum are treated with sulfuric acid in the heated state as described in Examples 1 or 2, and after stripping total water contained in the mixture are suspended to form a slurry in about 200 l of boiling-hot water and filtered off. The filter cake thus obtained may be dried or directly subjected to wet milling.

EXAMPLE 4

Fifty kilograms of REA gypsum, after the addition of sulfuric acid and heat treatment as described in Example 3, are suspended to form a slurry in boiling-hot water which had been admixed with about 600 g of Ca(OH)$_2$ for neutralizing the sulfuric acid having remained in the calcium sulfate anhydrite. After filtration, the filter cake may be dried in the known manner.

EXAMPLE 5

The calcium sulfate anhydrite II obtained in the Examples 1 to 4 may be compacted without an addition of water or binders alone or in admixture with REA gypsum dihydrate in a known manner using polar presses. The obtained compacts have a point strength in excess of 10N and are storable under open air.

If a process is operated in suspension as known so far, the water from the acid and the water of crystallization remain in the mixture. It, therefore, is necessary to remove the liquid by filtration or centrifugation from the solid particles of the suspension.

It could not be foreseen that according to the new process with moist powders, products are formed which are quite different with respect to properties, appearance and crystal structure, if compared with products which were formed in a suspension by recrystallization.

Furtheron, it was found that by addition of aluminum fluoride trihydrate (Al F$_3$ 3 H$_2$O) and other complex aluminum fluorides in an amount of less than 1% by weight of the dry REA gypsum, there are achieved products with extremely fine crystalline structure, which are compact, cubic and have a laminated structure. The particle size is about 5μm. They may be used as complex aluminum fluorides, potassium aluminum fluorides (K Al F$_4$) and sodium aluminum fluorides (Na$_5$Al$_3$F$_{14}$, chiolith). They are added in amounts of preferably 0.2 to 0.7% by weight of the dry REA gypsum and act as mineralisators. By means of these mineralisators, it is possible to achieve very specific products for specific purposes with preferred crystalline structures. The use of such mineralisators is explained in the following example:

EXAMPLE 6

Fifty kilograms of dry REA gypsum dihydrate are mixed with 5 l water homogeneously. In this 5 l of water 330 g (0.66% by
weight REA gypsum) of aluminum fluoride trihydrate (Al F$_3$ 3 H$_2$O) are dissolved and dispersed. Thereafter, 1.5 l of sulfuric acid having a density of 1.74 g/cm$^3$ are added and homogeneously mixed. The mixture is a moist powder. The mixture is kept at 90° C. for 2 hours under stirring. After the total amount of water (moisture water and water of crystallization) has been evaporated the product formed thereby is a dry white powder of rhombic calcium sulfate anhydrite II with very fine crystals. The primary crystals are mostly particles of compact, square and cubic form with a laminated structure and an average particle size of about 5 μm.

For further use, this product can be suspended in 80 kilograms boiling water with intensive stirring (ultraturrax) during 5 to 10 minutes. Thereafter, it is decanted or filtered. The filter cake thus obtained is excellently suitable as a coating agent in paper industry.

EXAMPLE 7

Treatment in a Direct-Fired Quick-Drier

Five thousand kilograms of dry REA gypsum dihydrate (gypsum dihydrate from flue gas desulfurization units) are mixed with 150 l of sulfuric acid having a density of 1.74 g/cm$^3$ which has been diluted with 500 l of H$_2$O and are rapidly heated in a quick-drier. The hot gas has a temperature of about 600° C. in the quick-drier inlet and of about 250° C. in the vent gas outlet. The feed rate of the REA gypsum mixture was 400 kg/h; the residence time in the quick-drier on the average was only a few minutes. The temperature of the material discharged from the quick-drier was 145° C.

This material was characterized and exhibited the following data:

TABLE 1

| pH-Value | Residual acid % | Weight loss at 360° C. % | Uptake water of crystallization upon addition of 1:5 p. of water | |
|---|---|---|---|---|
| | | | % after 2 hours | % after 24 hours |
| 2 | 0.59 | 3.4 | 10.1 | 15.5 |

The uptake of water of crystallization vs. the time after the addition of water (1:5 p. of H$_2$O) serves as a measure for the reactivity of the anhydrite. The less water of crystallization is absorbed, the lower is the reactivity. Part of this material immediately after its formation was exposed to an ambient temperature of 95° C. (annealed) in a 7 liter-container in a technical drying oven. The material interior temperature was measured and continuously recorded; samples were taken after 3, 4.5, 6 and 22 hours, respectively, and characterized as set forth above. The results are set forth in following Table. It was found that the sample treated for 22 hours had the lowest reactivity and the reactivity continuously decreases with an increase in the period of annealing, as is apparent from the following Table 2:

TABLE 2

| Sampled after hours | Material interior temperature °C. | pH-Value | Residual acid % | Weight loss at 360° C. % | Uptake water of crystallization upon addition of 1:5 p. of water | |
|---|---|---|---|---|---|---|
| | | | | | % after 2 hours | % after 24 hours |
| 3.0 | 82 | 2.0 | 0.59 | 2.5 | 3.4 | 9.1 |
| 4.5 | 82 | 1.9 | 0.62 | 2.0 | 3.4 | 7.0 |
| 6.0 | 82 | 2.0 | 0.56 | 2.1 | 2.4 | 7.3 |
| 22.0 | 91 | 2.0 | 0.56 | 1.3 | 1.0 | 3.5 |

EXAMPLE 8

Treatment in a Direct-Fired Rotary Kiln

Five thousand kilograms of dry REA gypsum dihydrate are mixed with 150 l of sulfuric acid having a density of 1.74 g/cm$^3$ which has been diluted with 500 l of H$_2$O and are heated in a rotary kiln.

The hot gas temperature was 1000° C. downstream of the rotary kiln burner, about 700° C. in the rotary kiln inlet and about 160° C. of the vent gas in the drum outlet of the rotary kiln, and the temperature of the material discharged from the drum was about 140° C. The material feed rate was 0.5 t/h. The residence time in the rotary kiln on the average was about 15 minutes. The material having been thus heated was then characterized and exhibited the following data set forth in Table 3:

TABLE 3

| pH-Value | Residual acid % | Weight loss at 360° C. % | Uptake water of crystallization upon addition of 1:5 p. of water | |
|---|---|---|---|---|
| | | | % after 14 days | % after 21 days |
| 2.2 | 0.58 | 1.1 | 14.5 | 20 |

Then this material was annealed at 100° C. for 1 hour and 3 hours, respectively.

The decrease in the reactivity as dependent on the annealing treatment is shown in the following Table 4 by way of the absorption of water of crystallization:

TABLE 4

| | Uptake water of crystallization upon addition of 1:5 p. of water | |
|---|---|---|
| | % after 14 days | % after 21 days |
| without annealing | 14.5 | 20 |
| annealed, 1 h, 100° C. | 6.1 | 20 |
| annealed, 3 h, 100° C. | 2.3 | 9.9 |

Result: The reactivity decreases with increasing time of annealing.

The samples thus annealed were washed with 1:2 p. of water, dried, and then the reactivity was again determined. In comparison thereto, the non-annealed washed sample was also investigated. The results are shown in the following Table 5:

TABLE 5

| | pH-Value | Residual acid % | Weight loss at 360° C. % | Uptake water of crystallization upon addition of 1:5 p. of water | |
|---|---|---|---|---|---|
| | | | | % after 14 days | % after 21 days |
| non-annealed, washed | 3.6 | 0.01 | 0.5 | 5.3 | 19.3 |
| annealed 1 h at 100° C. then washed | | | | 0.9 | 2.7 |
| annealed 3 h at 100° C. then washed | | | | 1.1 | 3.0 |

Result: The reactivity decreases greatly in the samples washed after the annealing operation.

In a further series of samples the samples having been annealed and washed as above were dried and then most intimately mixed with most finely divided CaCO$_3$ (about 0.5%), whereupon again the reactivity thereof was determined.

In comparison thereto, the non-annealed, washed sample admixed with CaCO$_3$ was also investigated. The results are shown in the following Table 6:

TABLE 6

| | pH-Value | Residual acid % | Weight loss at 360° C. % | Uptake water of crystallization upon addition of 1:5 p. of water | |
|---|---|---|---|---|---|
| | | | | % after 14 days | % after 21 days |
| non-annealed, washed and admixed with CaCO$_3$ | 7.5 | 0 | 0.5 | 1.6 | 4.3 |
| annealed 1 h at 100° C., then washed and admixed with CaCO$_3$ | | | | 0.6 | 0.8 |
| annealed 3 h at 100° C., then washed and admixed with CaCO$_3$ | | | | 0.5 | 0.8 |

Result: The reactivity decreases greatly in the samples washed after the annealing operation, then dried and then admixed with 0.5% of CaCO$_3$.

EXAMPLE 9

Treatment in an Indirectly Heated Aerated Disk Drier 1500 grams of dry calcium sulfate dihydrate are mixed with 30 ml of sulfuric acid having a density of 1.74 g/cm$^3$ and 120 ml of H$_2$O and are treated on the rotating disk indirectly heated with hot oil of 173° C. The evaporation of water ceases after 25 minutes.

This material was further heated (annealed) in the same apparatus without having been previously removed, and samples were taken after 35 minutes (Sample A), after 155 minutes (Sample B) and after 275 minutes (Sample C).

The evaporation and temperature conditions are set forth in TABLE 7.

TABLE 7

| | Samples Conditions Disk Drier | | A | B | C |
|---|---|---|---|---|---|
| 1 | Temperature heat carrier oil | °C. | 173 | 173 | 173 |
| 2 | Temperature disk wall | °C. | about 155 | about 155 | about 155 |
| 3 | Temperature of material during evaporation | °C. | 100 | 100 | 100 |
| 4 | Temperature of material during annealing | °C. | 150 | 150 | 150 |
| 5 | Final temperature of material when remove | °C. | 153 | 152 | 153 |
| 6 | Time of evaporation | min | 25 | 25 | 25 |
| 7 | Time of annealing | min | 35 | 155 | 275 |
| 8 | pH of removed material | | 1.3 | 1.5 | 1.7 |

These three samples were then characterized, and the reactivity was determined after the addition of 1:5 p. of water.

The results are summarized in the subsequent Table 8 and show a distinct decrease with time in the reactivity.

TABLE 8

| | Uptake of water of crystallization upon addition of 1:5 p. of water | | | | |
|---|---|---|---|---|---|
| | % after 7 | % after 14 | % after 21 | % after 28 | % after 35 days |
| A | 2.3 | 3.1 | 14.6 | — | — |
| B | 0.6 | 1.0 | 4.0 | 13.6 | 18.8 |
| C | 0.6 | 0.7 | 1.7 | 7.3 | 18.0 |

We claim:

1. A process for preparing calcium sulfate anhydrite by the reaction of calcium sulfate dihydrate with sulfuric acid at elevated temperatures, comprising:
    mixing reactants from the group comprising
    (a) finely divided calcium sulfate dihydrate,
    (b) 20% by weight or less of an acid solution, said acid solution containing sulfuric acid, said sulfuric acid being present in said mixture in a range between 0.5 and 7% by weight, and the mixture of the reactants being present in a moist powdery condition wherein the total liquids content of the mixture is 5–20% by weight, and
    heating said mixture at a temperature between 80° C. and 190° C. to obtain a substantially anhydrous product.

2. The process of claim 1, wherein said sulfuric acid is present in said solution in a weight range between 1 and 3%.

3. The process of claim 1, wherein said acid solution is present in said product in a weight range between 7 and 17%.

4. The process of claim 1, further comprising the step of annealing said mixture at a temperature between 80° C. and 190° C. for a time period of 0.3 to 24 hours to form an annealed product.

5. The process of claim 4, wherein said mixture is annealed at a temperature between 130° C. and 150° C. for a time period of 0.5 to 2 hours.

6. The process of claim 1, further comprising removal of residual sulfuric acid in the substantially anhydrous product by neutralization with calcium hydroxide and/or calcium carbonate.

7. The process of claim 1, wherein flowable powder of flue gas gypsum is employed as the source of calcium sulfate dihydrate.

8. The process of claim 1, wherein said process is terminated before it is completed to thereby result in a mixture of calcium sulfate anhydrite and calcium sulfate dihydrate.

9. The process of claim 8, further comprising compacting said mixture of calcium sulfate anhydrite and calcium sulfate dihydrate.

10. The process of claim 1, further comprising wet milling said calcium sulfate anhydrite to form particles smaller than 5μm.

11. The process of claim 10, further comprising wet milling said calcium sulfate anhydrite to form particles smaller than 2μm.

12. The process of claim 1, wherein said heating causes evaporation of any moisture water or water of crystallization.

13. The process of claim 1, further comprising adding an aluminum fluoride in an amount of less than 1% of the calcium sulfate dihydrate prior to (c) heating.

14. The process of claim 1, wherein heating is effected by heating with a direct-fired apparatus.

15. The process of claim 1, wherein heating is effected by rapid heating with an indirect heat-exchanger apparatus.

16. The process of claim 1, wherein said heating causes evaporation of adherent water from the acid solution or water of crystallization.

17. The process of claim 4, wherein the annealing procedure is carried out in a container wherein the reactants are loaded into the top of said container with discharge of the annealed product at the bottom of said container.

18. The process of claim 4, wherein the annealing procedure is carried out in the same apparatus in which the mixture is heated.

19. The process of claim 14, wherein vent gases of the direct-fired apparatus are passed on to a flue gas desulfurization unit.

20. The process of claim 14, wherein the direct-fired apparatus is operated by introducing hot gases of a combustion plant associated with a flue gas desulfurization unit into the direct-fired apparatus.

21. The process of claim 1, further comprising removal of residual sulfuric acid in the substantially anhydrous product by washing said product with water.

22. The process of claim 1, wherein the total liquids content of the mixture is 7–14% by weight.

* * * * *